United States Patent [19]
Rayner

[11] Patent Number: 5,735,434
[45] Date of Patent: Apr. 7, 1998

[54] DISPENSING APPARATUS WITH IMPROVED FLUID VALVE AND AIR KNIFE AND METHOD

[75] Inventor: David M. J. Rayner, Orangeville, Canada

[73] Assignee: Ingersoll-Rand Company, Woodcliff Lake, N.J.

[21] Appl. No.: 804,847

[22] Filed: Feb. 24, 1997

Related U.S. Application Data

[63] Continuation-in-part of Ser. No. 721,781, Sep. 25, 1996, abandoned.

[51] Int. Cl.⁶ .................................................. B67D 1/08
[52] U.S. Cl. .............................. 222/1; 222/148; 222/504; 222/559; 239/112
[58] Field of Search .............................. 222/1, 148, 504, 222/559; 239/112, 1, 290, 291

[56] References Cited

U.S. PATENT DOCUMENTS

| | | | |
|---|---|---|---|
| 3,512,550 | 5/1970 | Ammann | 137/553 |
| 3,729,168 | 4/1973 | Natho et al. | 251/60 |
| 4,076,210 | 2/1978 | Spielvogel | 251/285 |
| 4,457,341 | 7/1984 | Aspinwall | 137/625.48 |
| 4,461,450 | 7/1984 | Soland et al. | 251/63.5 |
| 4,542,766 | 9/1985 | Gawer | 137/559 |
| 4,794,847 | 1/1989 | Kreuter et al. | 92/136 |
| 4,801,051 | 1/1989 | Lewis et al. | 222/309 |
| 4,852,773 | 8/1989 | Standlick et al. | 222/504 |

Primary Examiner—Kevin P. Shaver
Attorney, Agent, or Firm—Michael M. Gnibus

[57] ABSTRACT

A dispensing apparatus for dispensing a material including a valve assembly comprising: a valve member movable in a reciprocating fashion along an axis, where the valve member includes a stem having at least one material transfer recess provided on the stem and a tapered dispensing end having an angle of taper. The valve member is movable between a first position where a discrete toroidal mass of material to be dispensed is formed at the dispensing end and a second position where a discrete toroidal mass of material to be dispensed is not formed at the dispensing end. The dispensing apparatus also includes a material dispensing assembly comprising having a fluid knife for moving the discrete toroidal mass to be dispensed from the dispensing end away from the dispensing end when the valve member is in the first position. The fluid knife is supplied substantially parallel to the angle of taper of the dispensing end.

22 Claims, 6 Drawing Sheets

DISPENSING APPARATUS WITH IMPROVED FLUID VALVE AND AIR KNIFE AND METHOD

This application is a continuation-in part of application Ser. No. 08/721,781, filed Sep. 25, 1996, now abandoned.

FIELD OF THE INVENTION

This invention generally relates to a fluid dispensing apparatus and method where the apparatus includes a fluid valve, and an air knife located at the dispensing end of the valve; and more particularly the invention relates to a dispensing apparatus where the fluid valve has a valve dispensing end adapted to dispense a discrete toroidal volume of fluid, and an air knife comprised of an air stream that is supplied substantially parallel to the valve dispensing end.

DESCRIPTION OF THE PRIOR ART

Fluid valves are frequently used to dispense relatively viscous materials, such as paints for example. When fluid valves are used to dispense viscous materials, a residue of the material is typically left at the dispensing end of the fluid valve when the valve is shut off or the flow of the viscous material is otherwise discontinued. If the residue is not removed from the dispensing end immediately when the material flow is discontinued, the residue will coagulate and harden and clog the dispensing end of the fluid valve. The accumulated residue will negatively affect the efficiency of the valve.

Additionally, if the fluid valve is closed and flow is discontinued, and the valve is opened again before the residue left on the valve dispensing end has fully coagulated, the residue will be drawn into the valve body by the vacuum created as the valve moves through the valve body. The material drawn into the valve will clog the valve.

Whenever the valve is clogged, the valve cannot operate to dispense material efficiently and as a result the clogged dispensing apparatus must be taken out of service so that the valve can be cleaned and unclogged. This results in increased downtime for the dispensing apparatus.

Further, "snuff back" valves are similarly designed whereby excess material is drawn back into a chamber adjacent to the valve shut off mechanism by an induced vacuum. However, in some viscous material applications, such as certain lithography inks for example, the mass of deposited viscous material remains attached to the valve by a connecting link or wisp of material of varying proportion.

In an effort to overcome valve clogging at the dispensing end and eliminate connecting links and wisps, an air knife is located proximate the dispensing end of the dispensing apparatus. In known dispensing apparatus, material is dispensed in a first direction, typically vertically, and the blast of air that comprises the air knife is directed toward the dispensed stream of material, in a second direction, typically horizontally, and is substantially perpendicular to the dispensed fluid stream. As the air knife engages the material stream, the material stream is severed. Although these known air knives are effective at limiting the volume of residue left at the dispensing end, known dispensing apparatus with this type of air knife do not eliminate the residue left at the dispensing end and still become clogged.

The foregoing illustrates limitations known to exist in present dispensing apparatus and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a dispensing apparatus for dispensing a material including a valve assembly comprising: a valve member movable in a reciprocating fashion along an axis, where the valve member includes a stem having at least one material transfer recess provided on the stem and a tapered dispensing end having an angle of taper. The valve member is movable between a first position where a discrete toroidal mass of material to be dispensed is formed at the dispensing end and a second position where a discrete toroidal mass of material to be dispensed is not formed at the dispensing end. The dispensing apparatus also includes a material dispensing assembly comprising having a fluid knife for moving the discrete toroidal mass to be dispensed from the dispensing end away from the dispensing end when the valve member is in the first position. The fluid knife is supplied substantially parallel to the angle of taper of the dispensing end.

The foregoing and other aspects will become apparent from the following detailed description of the invention when considered in conjunction with the accompanying drawing figures.

DETAILED DESCRIPTION OF THE PREFERRED EMBODIMENT

Figure 1:
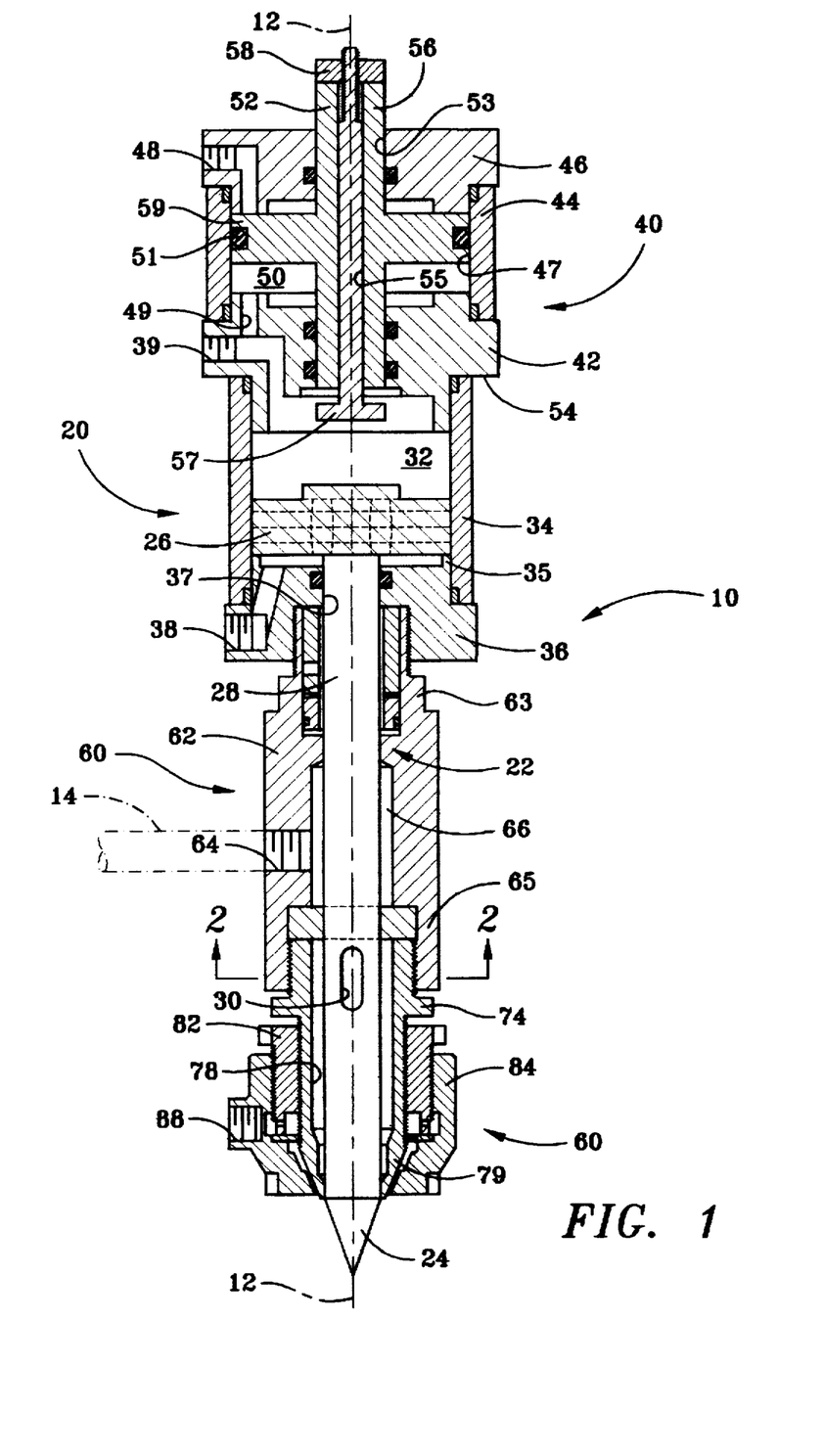
FIG. 1 is a longitudinal sectional view of a dispensing apparatus that includes the fluid valve and air knife of the present invention, showing the fluid valve in a no flow position.
Figure 2:
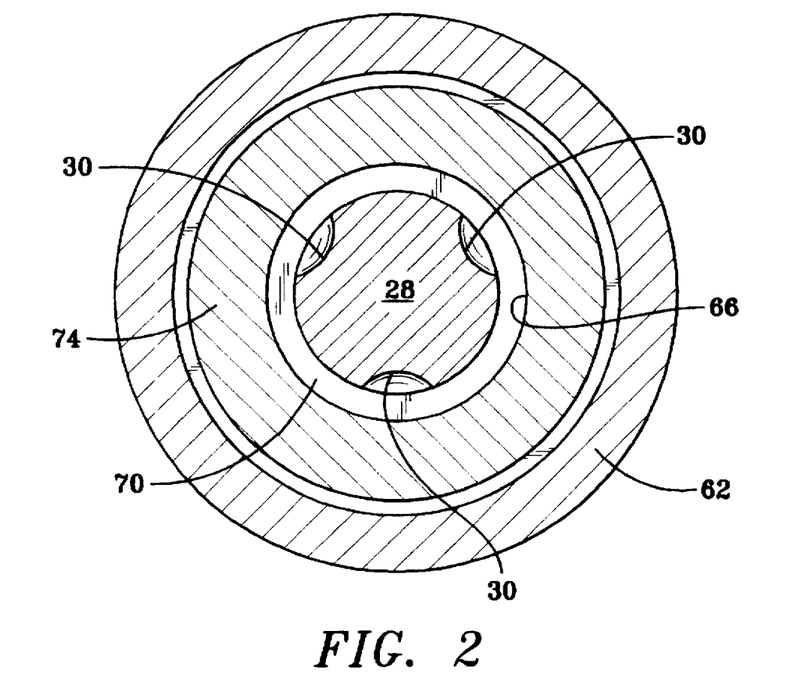
FIG. 2 is a sectional view taken along line 2—2 of FIG. 1.

FIGS. 1–6 show a first embodiment of the fluid dispensing apparatus of the present invention. Referring now to the drawings, wherein similar reference characters designate corresponding parts throughout the several views, FIG. 1 shows a fluid dispensing apparatus generally indicated at 10 which is generally comprised of a pneumatic valve assembly 20, that includes a piston valve 22 having a dispensing end 24; an assembly 40 for limiting the travel of the piston valve 22; and a dispensing assembly 60 which coacts with the dispensing end 24 of the piston valve 22 to dispense a material without leaving a residue at the dispensing end.

Figure 4:
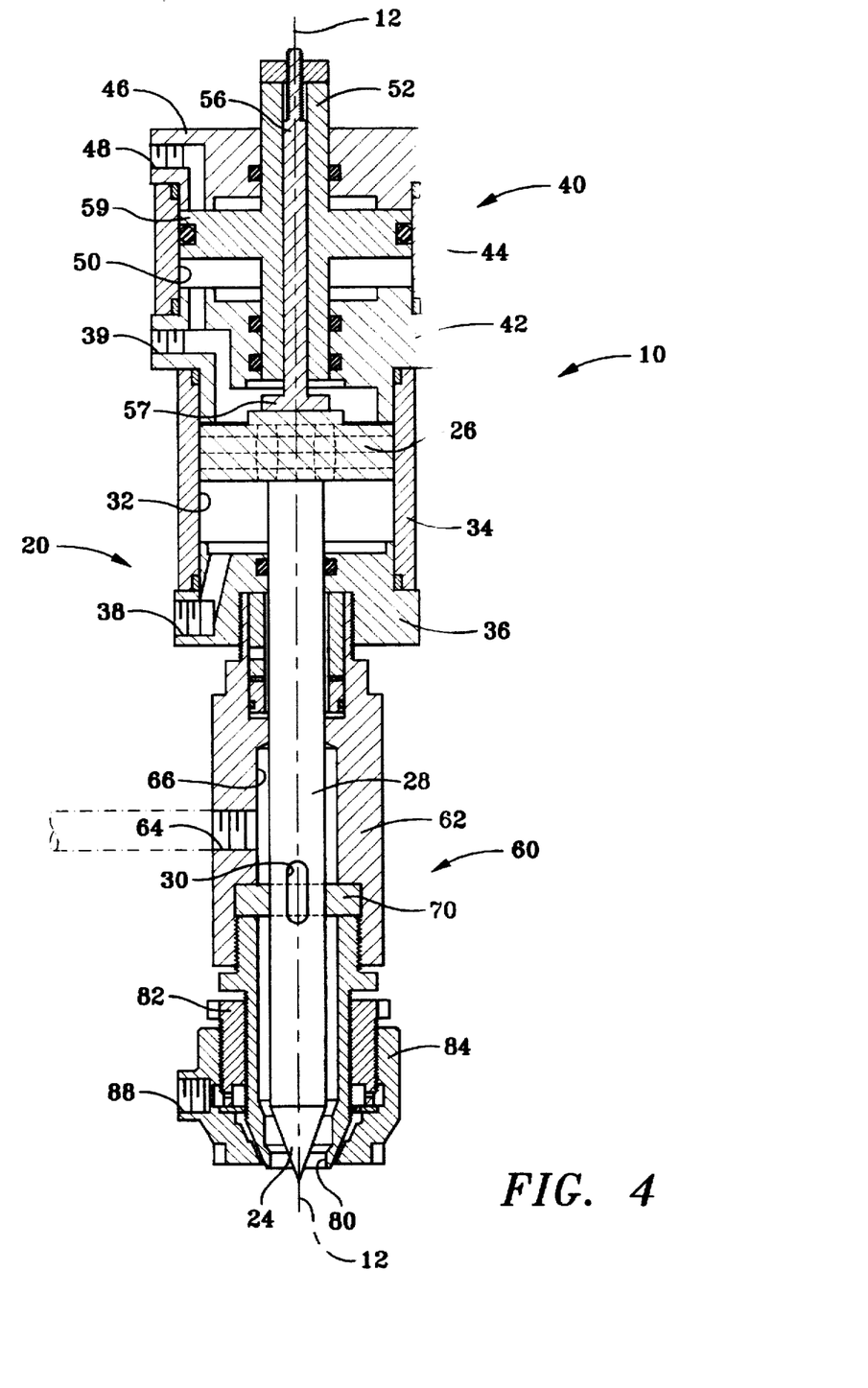
FIG. 4 is a longitudinal sectional view of the dispensing apparatus of FIG. 1 showing the fluid valve in a full flow position.
Figure 5:
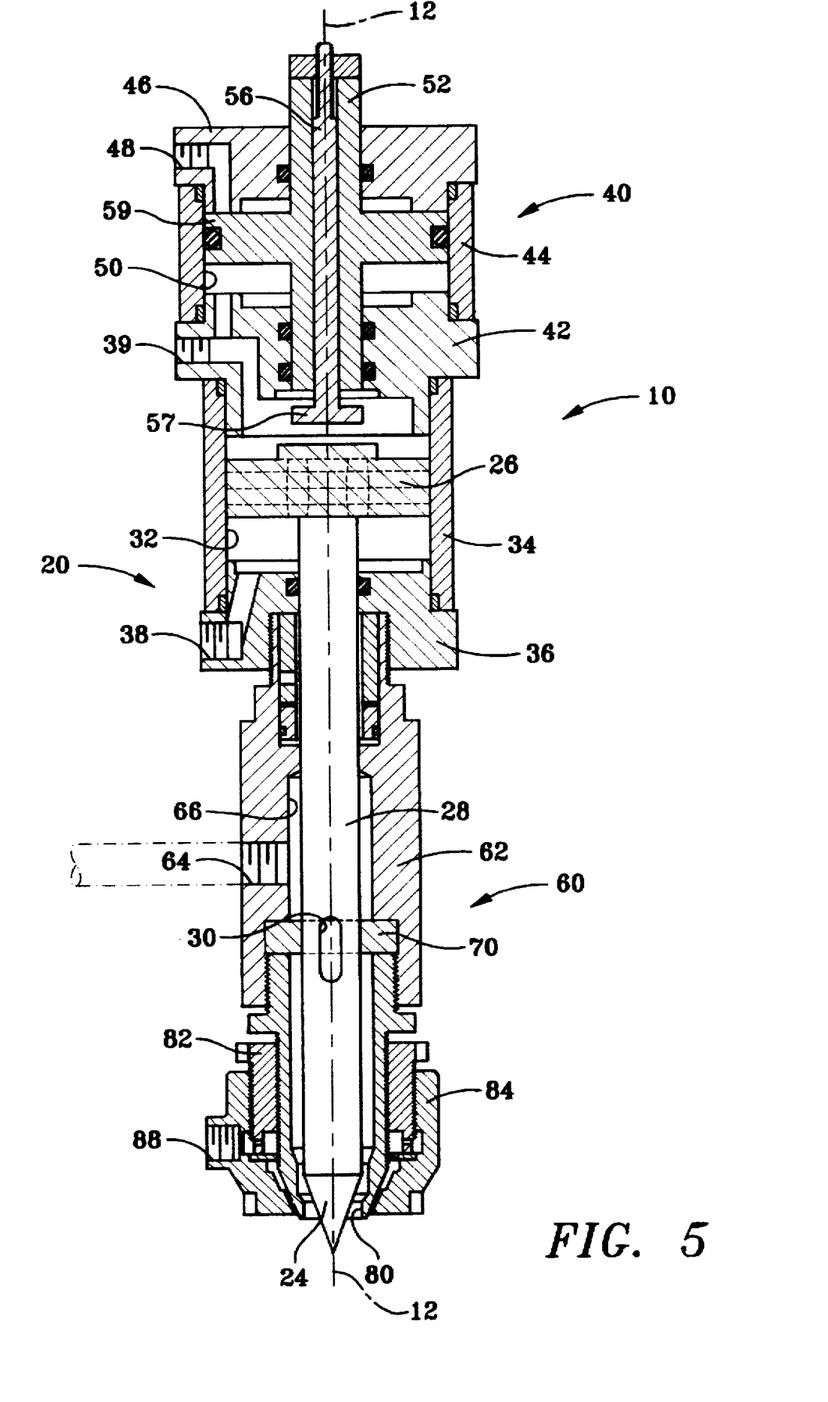
FIG. 5 is a longitudinal sectional view of the dispensing apparatus of FIG. 1 showing the fluid valve in a reduced flow position.

The piston valve 22 is movable linearly in a reciprocating manner along axis 12. The piston valve is movable between a no flow position shown in FIG. 1 where piston head 26 is located away from stop member 56 and a full flow position as shown in FIG. 4 where the piston head 26 is in abutment with stop member 56. During operation of apparatus 10, between the two extreme positions, the valve may be located in an intermediate, reduced flow position as shown in FIG. 5.

For purposes of clarity, as the description proceeds the substance dispensed by dispensing apparatus 10 may be referred to as "a fluid", "a material", or "a discrete mass of material". Additionally, the pressurized fluid for actuating the piston valve and assembly 40 of the dispensing apparatus may be air, an hydraulic fluid or any other suitable fluid.

The piston valve 22 of piston assembly 20 is comprised of a piston head 26 that is made integral with an elongate stem 28. The piston head is connected to one end of the stem in a conventional manner. Three material transfer recesses or scallops 30 extend longitudinally along the length of the stem. The scallops are located at substantially the same longitudinal position along the stem and are spaced equidistantly around the stem, each scallop being separated from the next adjacent scallop by 120°. See FIG. 2. The scallops or material transfer recesses serve to transfer a predetermined required volume of fluid toward the dispensing end of dispensing apparatus 10. For purposes of disclosing the preferred embodiment of the invention, three scallops are provided along the stem however it should be understood that any number of scallops required to transfer the predetermined required volume of fluid to the dispensing end of apparatus 10 may be provided.

The dispensing end 24 is formed at the end of stem 28 opposite the end joined to piston head 26. As shown most clearly in FIG. 3, the dispensing end is cone shaped, is tapered inwardly and terminates in a point. The dispensing end has an angle of taper identified as θ in FIG. 3 where θ is an acute angle.

The piston head 26 is movable linearly through piston chamber 32 which is defined by substantially cylindrical housing 34, first endcap 36 and second endcap 42 of assembly 40. The ends of the housing 34 are substantially closed by endcap 36 and by endcap 42 when assembly 40 is seated on the respective housing end.

The first endcap 36 includes an opening 37 that slidably receives stem 28 and permits the stem to move therethrough along axis 12. An annular stop member 35 is made integral with the endcap 36 and is located in chamber 32 when the endcap substantially closes the respective end of housing 34. The piston head 26 abuts the stop member 35 when the piston is in the full flow position as shown in FIG. 4. Port 38 is provided in endcap 36 and serves to flow connect a source of pressurized fluid (not shown) such as an air compressor with the chamber 32. The pressurized fluid is supplied to the chamber through port 38 as required to move the piston valve to the no flow position shown in FIG. 1.

Similarly, a pressurized fluid is supplied to the chamber 32 through port 39 formed in endcap 42 of assembly 40. Air supplied to the chamber through port 39 moves the piston valve to the dispensing position of FIG. 1.

Regarding ports 38 and 39, in addition to providing for the supply of pressurized fluid to chamber 32, pressurized fluid in the chamber 32 is exhausted from the chamber through ports 38 and 39 during operation of the dispensing apparatus 10. By supplying and exhausting pressurized fluid from chamber 32 to alternating sides of piston head 26, the piston valve is moved linearly in a reciprocating manner along axis 12. Conventional valves (not shown) well known to one skilled in the art, are flow connected to the ports to produce the required exhaust and supply sequence in the chamber and achieve the desired movement of the piston valve. For example a four-way valve may be provided at each port, 38 and 39 and the valves exhausting and supply functions may be controlled by a microprocessor.

Assembly 40 is seated on the second end of housing 34 and is connected thereto in a conventional manner such as by a threaded connection. The assembly includes a cylindrical housing 44 which is substantially closed at one end by a first endcap 46 and is substantially closed at a second end by second endcap 42. The endcaps 46 and 42 and housing 44 define chamber 50. A pressurized fluid such as compressed air is supplied to and exhausted from one end of chamber 50 by port 48 provided in first endcap 46 and is supplied to and exhausted from a second end of the chamber through port 49 that is formed in second end cap 42. Port 49 is partially obscured by port 39 in FIGS. 1, 4, and 5. Like ports 38 and 39, conventional valve (not shown) well known to one skilled in the art, are flow connected to ports 48 and 49 to exhaust fluid from and supply pressurized fluid to the chamber 50.

Endcaps 46 and 42 each include a respective opening 53 and 54 adapted to slidably receive a double ended piston rod 52. The piston rod is movable linearly along axis 12, through the openings. An axially extending threaded bore 55 is provided in the piston rod 52 and is adapted to threadably receive a threaded stop member 56 which may be a bolt or other threaded member. The stop member includes a head 57 that is located in chamber 32 when the assembly 40 is seated on the respective end of housing 34. See FIG. 1. The head limits the travel of piston valve 22 and is adapted to abut the piston head 26 as the piston valve is moved to the full flow and reduced flow positions shown in FIGS. 4 and 5. The location of the head 57 in the chamber 32 may be changed by threading the stop member into or out of the double ended piston bore 55. A locking nut 58 maintains the stop member in the required position during operation of dispensing apparatus 10.

A piston head 59 and the double ended piston 52 form a unitary member. The piston head 59 is located in chamber 50 and the piston head and double ended piston rod are movable together through the chamber. The piston head includes an annular groove 47 along the outer periphery of the piston head, and a conventional seal member 51 seated in the groove and adapted to form a seal with wall of housing 44 to prevent fluid leaks past the piston head 59.

When required, a limited volume of pressurized fluid may be flowed, through port 48 or port 49 to respectively move the piston head 59 along axis 12 toward and away from piston head 26 to decrease and increase the travel of the piston valve 22. When the valve 22 is in the full flow position shown in FIG. 4, air is exhausted through port 48 and is supplied to chamber 50 through port 49 displacing piston upwards against endcap 46, thereby permitting maximum upward travel distance for piston valve 22. When the piston valve is in the reduced flow position, air is exhausted out chamber 50 through port 49 and is supplied to the chamber through port 48 to move the piston into abutment with endcap 42 to prevent the piston valve from moving upward.

As shown in FIG. 1, the dispensing apparatus includes a number of conventional seal members located in grooves in the endcaps 42, 46 and 36; and in housings 34 and 44. The seal members form seals between the endcaps and housings and between the endcaps and stem 28 and rod 52 to prevent leaks during operation of the dispensing apparatus. These seals are conventional and are of the type well known to one skilled in the pertinent art such as o-ring seals.

Residue buildup at the dispensing end of dispensing apparatus 10 is eliminated by dispensing assembly generally indicated at 60 in FIG. 1. The assembly 60 includes a cylindrical main housing 62 having a first end 63, and a second end 65. The housing 62 is connected to endcap 36 by a threaded connection or by other conventional means and is adapted to receive the stem 28 of piston valve 22. Conventional bearings are located in the first end of main housing 62. The bearings are adapted to support movement of the stem through the housing. A fluid supply chamber 66 is defined by the interior portion of the wall of housing 62, the stem 28 and straddle cylinder 70. The straddle cylinder closes the end of the fluid supply chamber 66 nearest dispensing end 24.

The housing 62 includes an inlet port 64 that extends laterally through the housing wall. The fluid to be dispensed, such as paint, ink, or grease, is supplied through inlet 64 and into the fluid supply chamber 66 of dispensing assembly 60. The inlet 64 flow connects interior fluid supply chamber 66 with a fluid supply line 14, a representative portion of which is shown in dashed font in FIGS. 1, 4, and 5.

Figure 3:
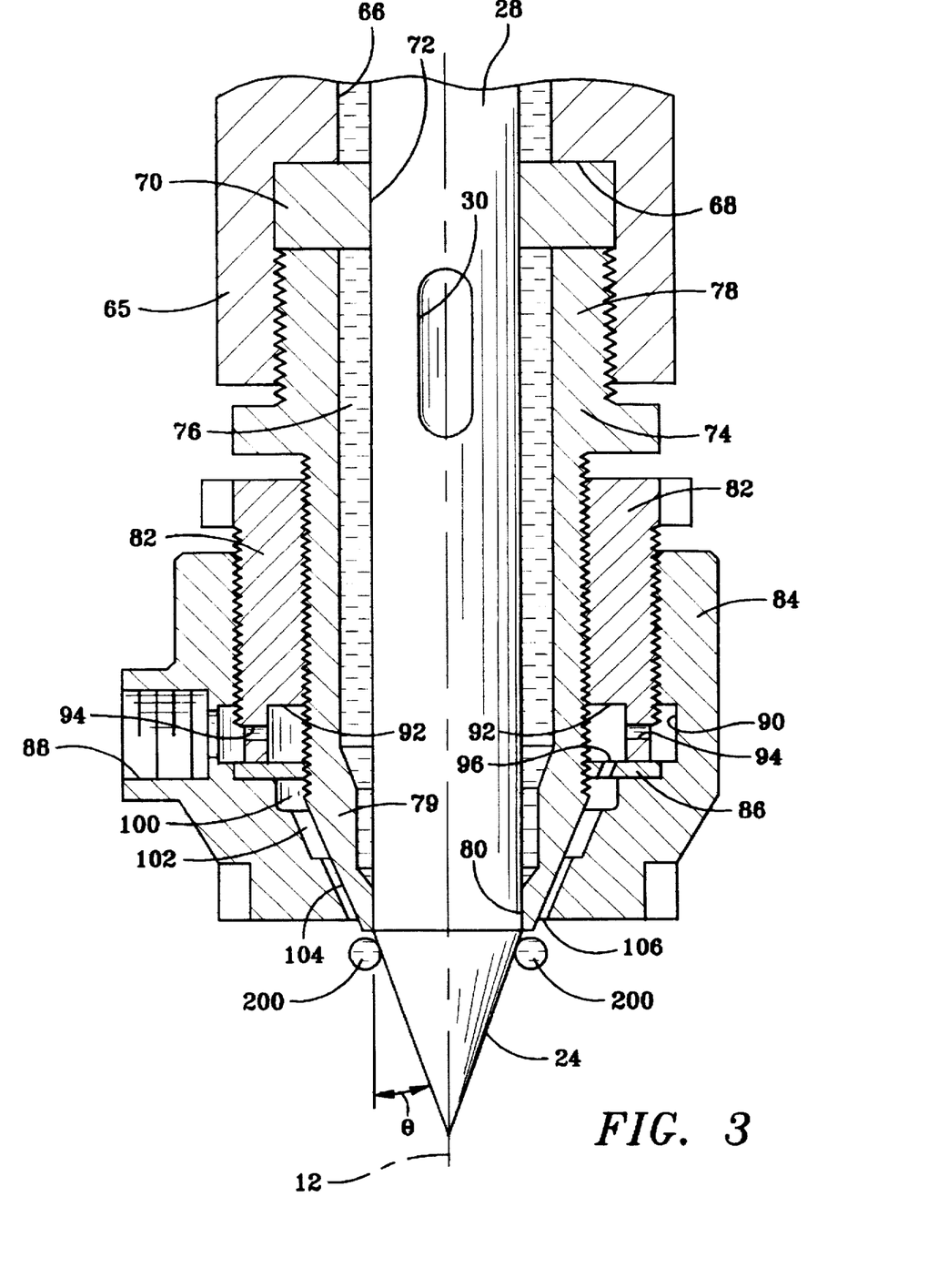
FIG. 3 is an enlarged view of a portion of the dispensing apparatus of FIG. 1.

Now turning to FIG. 3, a seat 68 is formed in the second end 65 of housing 62 and is adapted to receive a straddle cylinder 70. The straddle cylinder includes a centrally located passage 72. The stem 28 moves through the passage 72 along axis 12. The straddle cylinder effectively blocks the flow of the fluid out of supply chamber 66 toward the dispensing end.

The straddle cylinder is sandwiched between the housing 62 and a first end 78 of substantially cylindrical valve retainer 74. The stem 28 is movable through the valve retainer. A valve retainer chamber 76 is defined by the stem, the wall of the valve retainer and the straddle cylinder. As shown in FIGS. 1, 3, and 4, the straddle cylinder 70 serves to produce discrete chamber 66 which may be referred to as an "upstream" chamber and chamber 76 which may be referred to as a "downstream" chamber. During operation of dispensing apparatus 10, the scallops 30 move fluid in supply chamber 66 out of the chamber and deposit the removed volume of fluid in chamber 76. The deposited fluid remains in the chamber 76 until it is dispensed by the apparatus 10.

Figure 6:
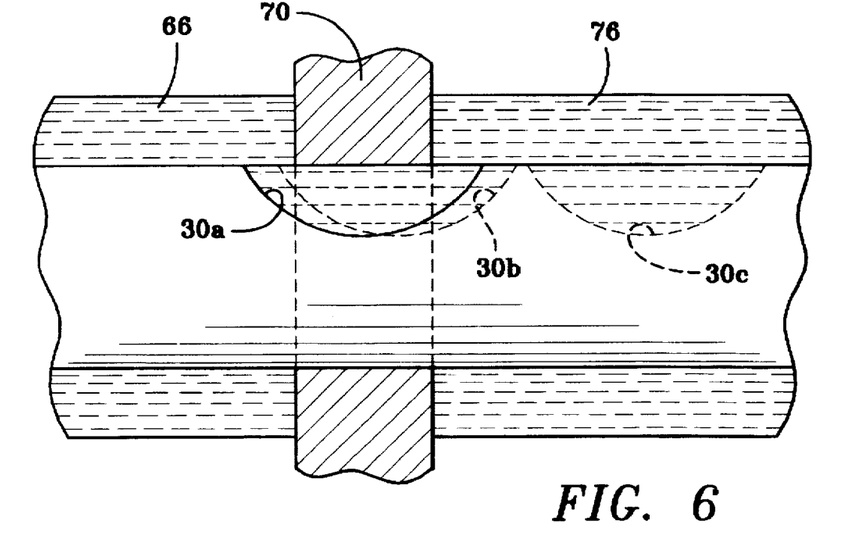
FIG. 6 is an enlarged view of a portion of the fluid valve showing the full, reduced, and no flow locations of one of the material transfer recesses relative to the straddle collar.

Referring now to FIG. 6, during operation of apparatus 10, the scallops 30 are repositioned relative to the collar as the piston valve is moved to the full flow, reduced flow and no flow positions shown in the Figures. When the scallops 30a are in the full flow position, the scallops straddle the collar 70 so that one end of each of the scallops is in fluid receiving communication with supply chamber 66 and the other end of each of the scallops is in fluid transferring relation with chamber 76. By positioning the scallops 30a in this way, the scallops allow for maximum orifice cross section and therefore maximum flow between chambers 66 and 76. When it is necessary to reduce the volume of material transferred from chamber 66 to chamber 76, pressurized fluid is supplied to chamber 32 displacing the piston valve downward, moving the scallops so that the end of the scallops 30b adjacent supply chamber 66 is located proximate the edge of the collar 70. In this way the orifice cross section in fluid receiving communication with supply chamber 66 is significantly reduced and therefore flow between the chambers 66 and 76 is likewise significantly reduced. Further movement of the valve 22 downward moves the scallops 30c to the no flow position where no portion of the scallops is in fluid receiving communication with chamber 66.

The valve retainer 74 includes an opening 80 at a second end 79. The second end is tapered inwardly toward axis 12 and the angle of taper is substantially equal to the angle of taper provided at stem dispensing end 24. As shown in FIG. 3, the valve retainer chamber 76 is narrowest at the second end 79 to ensure that the required predetermined volume of fluid is dispensed out the opening 80.

A first collar 82 is fixed to the valve retainer along the exterior portion of the valve retainer body. A dispensing collar 84 is connected to the exterior of collar 82. A plate 86 is sandwiched between the collars. A fluid inlet port 88 is provided in the dispensing collar 84 and is flow connected to a first annular flow channel 90. The first flow channel is also known to those skilled in the art as a "pie ring". The collars 82 and 84 and plate 86 in combination define the first flow channel 90. A second annular flow channel 92, like first annular flow channel 90 is formed by the valve retainer, collar 82 and plate 86. The volume of the second annular flow channel 92 is greater than the volume of the first annular flow channel 90. The first and second channels or "pie rings" are flow connected by a third annular channel 94. In this way, pressurized fluid that is supplied through port 88 is flowed into channel 90, continues through channel 94 and into channel 92. The configuration of flow channels 90, 92, and 94 serves to evenly distribute the pressurized fluid supplied through inlet 88 to the dispensing assembly.

Plate 86 includes a circular array of openings 96, spaced around the plate so that the openings are located below the annular chamber 92. The openings 96 flow connect flow channel 92 with first gallery 100. The fluid that is flowed into channel 92 continues through the openings 96 and into the first of three annular dispensing galleries 100, 102, and 104. Each of the galleries is defined by the tapered second end 79 of the valve retainer 74 and the dispensing collar 84. The volumes of the dispensing galleries are progressively smaller the closer the gallery is located to the opening 106 and as a result, the velocity of the pressurized fluid flowed through the galleries increases as it moves towards opening 106.

Since a portion of each of the galleries is defined by the second end 79 of valve retainer 74 the galleries are directed inwardly at an angle substantially equal to the angle of taper of dispensing end 24 so that the fluid that is discharged from opening 106 is directed substantially parallel to the dispensing end 24. The fluid directed out of opening 106 acts as an air knife for the dispensing apparatus 10 and in this way, the fluid is dispensed out of dispensing apparatus 10 without the buildup of residue at the dispensing end.

Operation of dispensing apparatus 10 will now be described.

Initially, before the dispensing apparatus 10 is operated, the head of stop member 56 is located in the required position in chamber 32 by adjusting the locking nut 58. Then the stop member 57 is located at the upper end of chamber 32 by supplying a pressurized fluid to chamber 50 thereby moving piston head 59, piston 52 into engagement with endcap 46 as shown in FIGS. 1 and 4. Once the stop member is located in the desired position to limit travel of piston head 26 to the required extent, the dispensing apparatus is ready for operation.

A viscous material is supplied to supply chamber 66 through port 64 and fills the supply chamber. A pressurized fluid is supplied through port 38 into chamber 32. The pressurized fluid moves the piston linearly upwards along axis 12 towards stop member 56.

After the valve piston is moved upward into abutment with head 57, the scallops 30 of stem 28 straddle the collar 70 as shown in FIG. 4 and are located in the full flow position described hereinabove with the respective ends of the scallops in fluid receiving and transferring communication with chambers 66 and 76 respectively. The scallops in the full flow position until approximately 90% of the predetermined required volume of material is flowed from chamber 66 to chamber 76 through scallops 30a. A conventional microprocessor is programmed to execute a logic routine to determine accurately when 90% of the predetermined required volume has been supplied to chamber 76.

When it is computed that the 90% threshold has been met, a fixed volume of pressurized fluid is supplied to chamber 32 and the piston is displaced downward a fixed distance. The scallops 30b are then located in a reduced flow position shown in FIG. 5 and the volume of fluid transferred from chamber 66 to chamber 76 is reduced. The scallops remain in the reduced flow position until the predetermined volume of material has been transferred to chamber 76. In order to show the extent the scallops 30a straddle the collar and the location of the end of the scallop 30b proximate the collar, in FIGS. 1, and 4-6, the edge of the collar is represented in dashed font.

When the piston valve is located in the reduced flow position, the fluid in chamber 50 is exhausted out port 49 and is supplied to chamber 50 through port 49 thereby moving piston head 59 into abutment with endcap 42 and locating stop member head 57 into chamber 32. The stop member prevents the piston valve 22 from displacing upward.

The microprocessor then supplies pressurized fluid to the chamber 32 to move the valve to the dispensing position shown in FIG. 1, and the scallops 30c are located in the no flow position, thereby terminating the flow of material from chamber 66 to chamber 76.

The pressurized fluid in chamber 32 is exhausted out port 38 and a pressurized fluid is supplied through port 39 into chamber 32, thereby displacing the piston valve away from stop member 56, downward, along axis 12.

As the valve 22 is moved to the no flow position, the following steps occur substantially simultaneously. Material in chamber 76, nearest the opening 80 is forced towards opening 80 as the dispensing end 24 descends and moves towards the opening. As the discrete volume of material is forced towards the opening it is separated from the remaining volume of material in chamber 76 and is squeezed between the dispensing end 24 and the second end 79 of retaining valve 74 and thereby is formed into a toroidal mass 200. The toroidal mass is forced out of the opening 80 and onto the dispensing end 24. The mass then rolls off of the dispensing end and is supplied to fill a container (not shown) such as a paint can. By forming a discrete toroidal mass at the dispensing end 24 and rolling the mass off the end, no residue is left at the end. Clogging is prevented.

The mass 200 is rolled off of the dispensing end by the air knife that is provided at end 106 and is assisted by the inward taper of the dispensing end and the effects of gravity. Pressurized air is supplied through port 88 and is flowed through first annular flow channel 90, third channel 94 and into second annular flow channel 92. This initial flow pattern serves to evenly distribute the air pressure as it is flowed therethrough. The air in flow channel 92 is flowed through the openings 96 in plate 86 and into first dispensing gallery 100. The velocity of the air increases as it flows through second gallery 102 and third gallery 104. The volume of air that is flowed out end 106 is substantially parallel to the dispensing end 24. In this way, the air is accurately directed against the toroidal mass 200 that is dispensed and effectively helps to produce the rolling action off the dispensing end.

In this way, no residue is left at the dispensing end. Because the toroidal mass is moved out of contact with the dispensing end as it moves downward, negative effects of friction are eliminated. Additionally, the precise required volume of material is supplied. The combination of the fluid valve and air knife can achieve volumetric accuracies within ±½ of 1%.

The piston head abuts stop member 35 when the piston valve is in the no flow position shown in FIG. 1. After the toroidal mass is dispensed, the fluid is exhausted out port 38, pressurized fluid is flowed through port 39 into chamber 32 and the process is continuously rapidly repeated.

After the material has been dispensed it is weighed by a very precise scale (not shown) and the actual weight of the dispensed volume of material is compared with the weight for the predetermined required volume of material stored in the microprocessor logic routine. If the weight of the actual dispensed volume of material is less than or greater than the predetermined required volume, the logic routine will signal an error.

Figure 7:
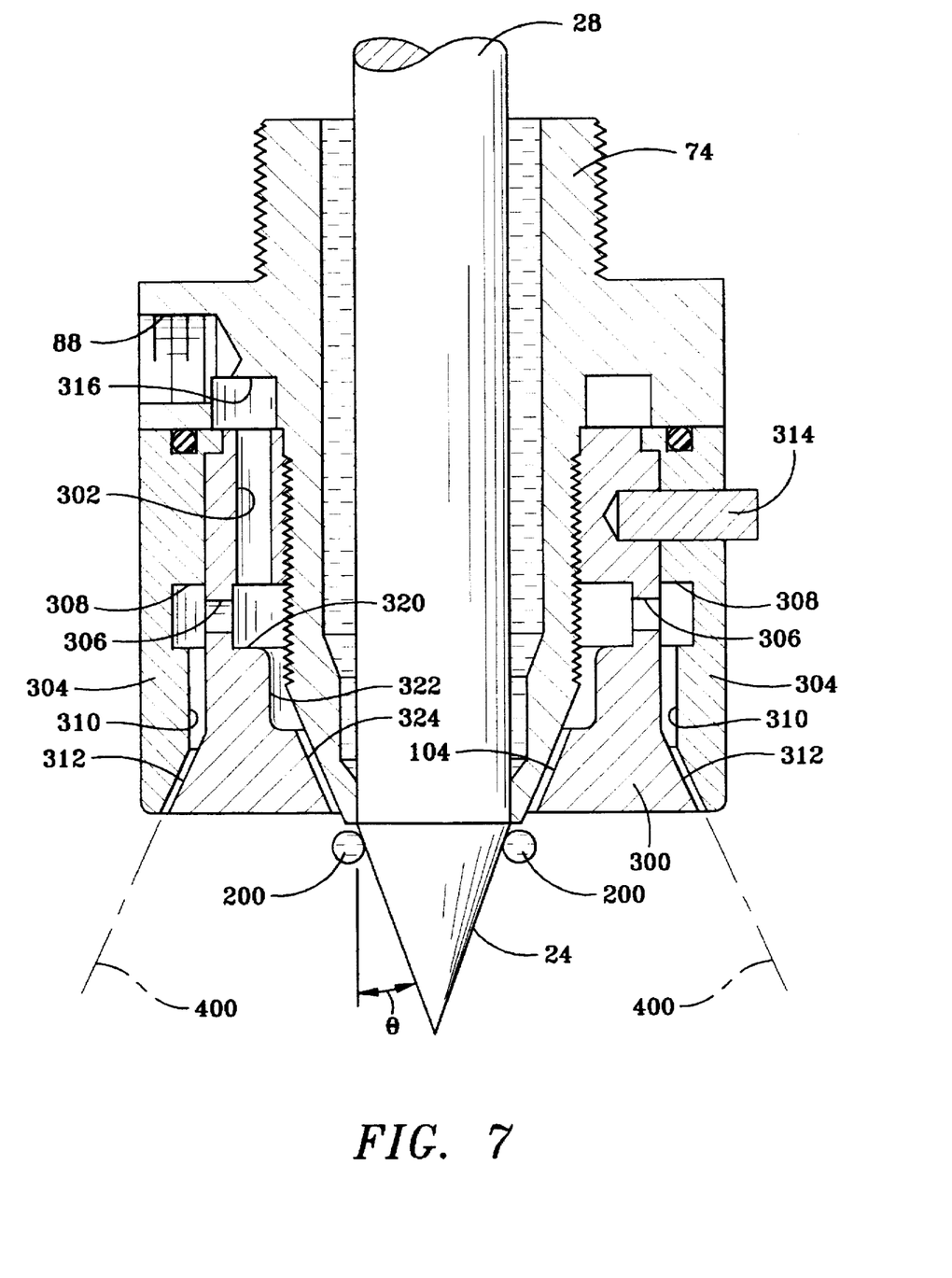
FIG. 7 is an enlarged view of a portion of a second embodiment of the fluid dispensing apparatus of the present invention.

A second embodiment fluid dispensing apparatus 250 is disclosed in FIG. 7. The second embodiment of the fluid dispensing apparatus dispenses a toroidal mass of material 200 in the manner described hereinabove, and apparatus 250 includes all of the elements in the same relationships as previously described hereinabove in conjunction with the description of the first embodiment dispensing apparatus 10. Therefore, for purposes of brevity, the description of the second embodiment dispensing apparatus 250 will primarily include those elements unique to apparatus 250.

Turning now to FIG. 7, the second embodiment dispensing apparatus 250 includes dispensing collar 300 that is connected to the valve retainer 74. The dispensing collar and second end 80 of the valve retainer define first, second, and third annular dispensing galleries 320, 322, and 324, like annular dispensing galleries 100, 102, 104. Like apparatus 10, pressurized gas is flowed from the third gallery 324 at an angle substantially parallel to the angle of taper θ of the dispensing end 24.

Annular gallery 316 flow connects inlet 88 with a series of bores 302. The bores serve to join the gallery 316 and the first dispensing gallery 320. The bores are spaced in a circular array around the dispensing collar 300.

An air curtain collar 304 is threadably joined to the exterior of dispensing collar 300. The interior portion of the air curtain collar 304 and the exterior of the dispensing collar define, first, second, and third annular air curtain galleries 308, 310, and 312 respectively. A series of radial bores 306 join the first dispensing and first air curtain galleries. As shown in FIG. 7, the third air curtain gallery and the third dispensing gallery are divergent.

The air curtain collar is removably connected to the fluid dispensing collar by pins 314 or other suitable conventional connection members.

In operation, pressurized air is introduced through inlet 88, and is flowed through circular gallery 316 and bores 302. The pressurized air stream then splits with a portion of the volume of pressurized air continuing into the air curtain galleries and the remainder of the air stream flowing through the fluid dispensing galleries. The air that is dispensed out of the air curtain gallery is directed away from the toroidal mass 200 and forms an endless air curtain 400 around the mass. In this way, material from adjacent dispensing apparatus can not mix with material 200 and the precise volume of material is dispensed.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A dispensing apparatus for dispensing a material, the apparatus comprising:
   a) a valve assembly comprising:
      1) a valve member movable in a reciprocating fashion along an axis, said valve member including a stem having at least one material transfer recess provided on the stem and a tapered dispensing end having an angle of taper, said valve member movable between a first position where a discrete toroidal mass of material to be dispensed is formed at the dispensing end and a second position where a discrete toroidal mass of material to be dispensed is not formed at the dispensing end; and
   b) a material dispensing assembly comprising: fluid knife means for moving the discrete toroidal mass to be dispensed from the dispensing end away from the dispensing end, when the valve member is in the first position, said fluid knife means being supplied substantially parallel to the angle of taper of the dispensing end.

2. The dispensing apparatus as claimed in claim 1 wherein the dispensing assembly further comprises: a first housing; a second housing; a collar located between the first and second housings, the stem movable through said housings and said collar; said collar, stem and first housing defining a first chamber and said collar, stem and collar defining a second chamber; said valve member movable between a first valve position where the at least one material transfer recesses are located in fluid receiving communication with the first chamber and a second valve position where the at least one material transfer recesses are not in fluid communication with the first chamber.

3. The dispensing apparatus as claimed in claim 1 the apparatus further comprising means for forming a fluid curtain around the toroidal mass, said fluid curtain forming means located at the dispensing end.

4. The dispensing apparatus as claimed in claim 3 wherein the fluid curtain formed around the toroidal mass is endless.

5. The dispensing apparatus as claimed in claim 3 wherein said material dispensing assembly includes a material dispensing collar, located at the dispensing end, and wherein said means for forming a fluid curtain is comprised of an air curtain collar, said air curtain collar and material dispensing collar defining air curtain gallery means.

6. The dispensing apparatus as claimed in claim 5 wherein the air curtain gallery means and fluid knife means are divergent.

7. The dispensing apparatus as claimed in claim 5 wherein said air curtain gallery means is comprised of first, second, and third air curtain galleries.

8. A method for dispensing a volume of material from a dispensing apparatus having a housing which defines a first chamber and a second chamber, a housing wall and a housing opening, a valve movable through the housing said valve having a stem with at least one material transfer recess, and a dispensing end with an angle of taper, the method comprising the following steps:
   a) supplying a volume of material to the first chamber;
   b) moving the valve to a full flow position with a portion of the at least one material transfer recesses is in fluid receiving communication with the first chamber and a second portion of each of the at least one material transfer recesses is in fluid transfer communication with the second chamber;
   c) forming a toroidal mass of material between the housing wall and the dispensing end of the valve; and
   d) supplying an air knife at an angle substantially parallel to the angle of taper of the dispensing end to force the toroidal mass of material from the dispensing end.

9. The method as claimed in claim 8 comprising the additional step of weighing the dispensed volume of material after step d).

10. The method as claimed in claim 8 including the further step of moving each of the at least one material transfer recesses to a reduced flow position after step b).

11. The method as claimed in claim 10 wherein each of the material transfer recesses is moved to the reduced flow position only after approximately 90% of the predetermined required volume has been supplied to the second chamber.

12. The method as claimed in claim 8 wherein step d) also includes the step of forming an air curtain around the toroidal mass.

13. The method as claimed in claim 12 wherein the air curtain formed during step d) is endless.

14. A dispensing apparatus for dispensing a material, the apparatus comprising:
   a) a valve assembly comprising:
      1) a valve member movable in a reciprocating fashion along an axis, said valve member including a stem having at least one material transfer recess provided on the stem and a tapered dispensing end having an angle of taper, said valve member movable between a first position where a discrete mass of material to be dispensed is formed at the dispensing end and a second position where a discrete mass of material to be dispensed is not formed at the dispensing end; and
   b) a dispensing assembly comprising:
      1) a first housing;
      2) a second housing;
      3) a collar located between the first and second housings, the stem movable through said housings and said collar; said collar, stem and first housing defining a first chamber and said collar, stem and collar defining a second chamber; said valve member movable between a first valve position where the at least one material transfer recesses are located in fluid receiving communication with the first chamber and a second valve position where the at least one material transfer recesses are not in fluid communication with the first chamber;
      4) fluid knife means for moving the discrete mass to be dispensed from the dispensing end away from the dispensing end, when the valve member is in the second position, said fluid knife means being supplied substantially parallel to the angle of taper of the dispensing end.

15. The dispensing apparatus as claimed in claim 14 wherein there are three material transfer recesses spaced equidistantly around the stem.

16. The dispensing apparatus as claimed in claim 14 wherein the discrete mass dispensed has a toroidal shape.

17. The dispensing apparatus as claimed in claim 14 wherein the fluid knife means includes a first gallery, a second gallery and a third gallery each gallery having a volume, the volume of said third gallery being less than the volumes of the first and second galleries.

18. The dispensing apparatus as claimed in claim 17 wherein the dispensing apparatus further includes a first collar joined to the second housing and the second housing includes an end, said first, second, and third galleries being defined by the first collar and the second end.

19. The dispensing apparatus as claimed in claim 14, further comprising a first collar joined to the second housing, a second collar joined to the first collar, and a plate located between the collars, said first and second collars and plate defining first and second flow chambers, said first and second flow chambers being flow connected by a third flow chamber, said plate includes a plurality of passages in fluid receiving relationship with said second flow channel.

20. The dispensing apparatus as claimed in claim 19 wherein said second housing includes a second end, and said second end and said second collar define first, second, and third galleries, said second end having an angle of taper substantially equal to said angle of taper at said dispensing end.

21. The dispensing apparatus as claimed in claim 14 wherein the valve member is comprised of a piston valve having a piston head movable through a piston housing, said piston housing including a first end, said apparatus further comprising an assembly for limiting the travel of the piston valve when the piston valve is in the second position, said assembly adapted to be located at the second end of the piston housing end.

22. The dispensing apparatus as claimed in claim 21, wherein said piston housing also includes a second end; said first piston housing end adapted to be substantially closed by a first endcap, said assembly comprising an assembly housing; a second endcap for substantially closing one end of the assembly chamber and the second end of the piston housing; said first endcap, piston housing and second endcap defining a piston chamber, said assembly further comprising a third endcap, said assembly housing, second and third endcaps defining an assembly chamber, a piston rod and piston head made integral and adapted to be movable through the assembly chamber, said piston rod including a bore extending therethrough and a stop member adapted to be located in the bore the stop member having a stop member end adapted to be located in the piston chamber during operation of the dispensing apparatus to abut the piston head and limit travel of the piston valve.

* * * * *